United States Patent [19]
Breish

[11] 3,859,686
[45] Jan. 14, 1975

[54] SCRUBBING APPARATUS FOR VEHICLES

[75] Inventor: Donald E. Breish, Willingboro, N.J.

[73] Assignee: Sherman Car Wash Equipment Co., Palmyra, N.J.

[22] Filed: May 23, 1973

[21] Appl. No.: 363,184

[52] U.S. Cl. .............................. 15/97 R, 15/DIG. 2
[51] Int. Cl. .............................................. B60s 3/04
[58] Field of Search ....................... 15/DIG. 2, 97 R

[56] References Cited
UNITED STATES PATENTS

| | | | |
|---|---|---|---|
| 3,487,490 | 1/1970 | Wuster............................ | 15/DIG. 2 |
| 3,499,180 | 3/1970 | Hurwitz........................... | 15/97 R |
| 3,510,898 | 5/1970 | Tatara et al. .................... | 15/DIG. 2 |
| 3,683,441 | 8/1972 | Fromme.......................... | 15/DIG. 2 |
| 3,765,043 | 10/1973 | Lesser............................. | 15/DIG. 2 |

*Primary Examiner*—Edward L. Roberts
*Attorney, Agent, or Firm*—Sidney A. Ochs

[57] ABSTRACT

A friction scrubbing apparatus having sections of curtain-like-scrubbing elements disposed from a support across a path determined by relative movement between the vehicle and support. A dual operating system couples the sections with the support and provides the sections with a forward and backward motion both horizontally and vertically facilitating a flicking action by the curtain elements generally paralleling the path, on parts of the vehicle. A phase relationship of the systems is selected to provide movement of one section in one direction along the path while another moves in the opposite direction during a substantial portion of the operating cycle. During movement in the same relative direction as the vehicle the sections provide an action which is one simulating an overtaking of the vehicle.

16 Claims, 9 Drawing Figures

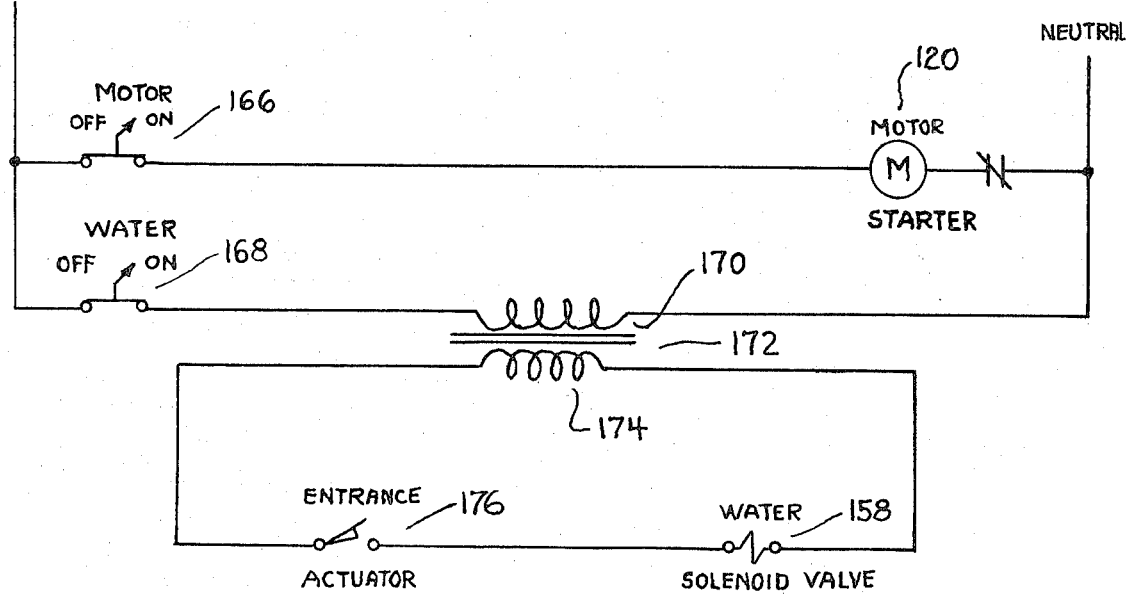
FIG. 5
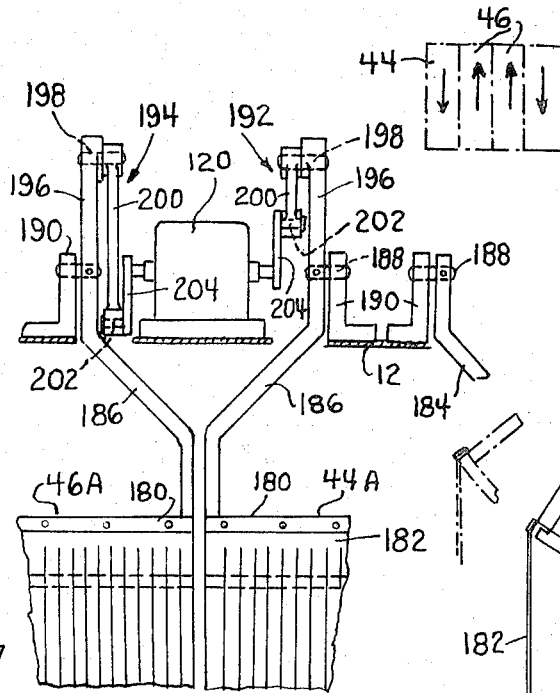
FIG. 6
FIG. 7
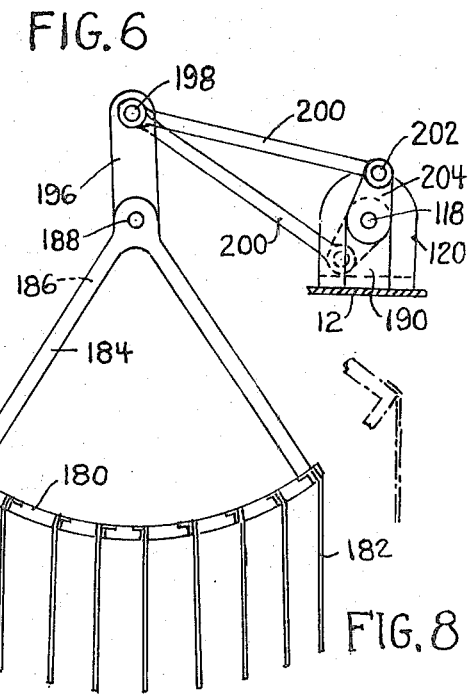
FIG. 8

SCRUBBING APPARATUS FOR VEHICLES

BACKGROUND OF THE INVENTION

This invention relates to friction scrubbing apparatus for cleaning the surfaces of a vehicle. It especially concerns scrubbing apparatus involving a plurality of scrubbing sections disposed from supporting means such as a frame or arch across a longitudinal path determined by relative movement between the support and vehicle to be cleaned and wherein the scrubbing sections are reciprocated.

Scrubbing apparatus of this general character are shown in U.S. Pat. Nos. to Hurwitz 3,499,180, Shusett et al. 2,658,216, Tatars et al. 3,510,898 and Hanna et al. 3,517,405. As seen in such patents the vehicles are acted upon by a solid mass of scrubbing elements extending entirely across the vehicle all moving in the same direction. The drag or impact of such elements in these constructions tends to displace the vehicles, especially light weight vehicles, and tends to cause vehicles moved by a conveyor system to jump or run ahead of conveyor rollers. Such arrangements depend primarily on a wiping action as distinguished from scrubbing and provide inadequate cleaning of the vertical and lower surfaces of a vehicle.

It is an object of the invention to provide a plurality of sections or members each comprising a multiplicity of curtain-like scrubbing elements which sections extend across a vehicle and are supported and oscillated through a dual operating system of levers and linkage in a way that materially divides and balances the scrubbing forces so as to reduce substantially the effect of impact energy in imparting undesirable side or longitudinal motion to a vehicle being cleaned yet fully utilizing such energy for scrubbing purposes. The arrangement is such that during a substantial part of the operating cycle one section of curtains moves in one direction longitudinally of the vehicle, while a second section moves in the opposite direction, the two sections preferably oscillating at least about 90° and better still 180° out of phase. In this way the impact on the sides and ends of cars of a single mass of elements impelling them forward or backward or side to side and causing them to jump or run ahead of conveyor rollers is materially reduced or avoided. Moreover a balance of inertia and friction scrubbing forces may be obtained that produces a smooth running apparatus and reduces maintenance.

Another object is to provide scrubbing and cleaning of the lower portions of bumpers at the front and rear of vehicles not provided by other known devices. Thus in the present invention when a vehicle is not directly under all the strands or strips of the curtains those that hang free can, because of their mass and flexibility and the speed being imparted to them, swing out beyond the curtain support at each end of an oscillation of a section and enable the lower ends or tips of the curtain strips to flick at and clean surfaces such as the lower portions of bumpers and recessed window wiper wells which would not be otherwise cleaned.

A further object is to impart a linear speed to the curtains such that the strips will swing out beyond their support when moving toward a vehicle and enable their tips to flick at and work on the front vertical surface, upper sides and side windows of a vehicle, and to provide a linear speed of the strips on the return stroke which will be greater than the relative linear speed between the vehicle surface and curtain support in the same direction of movement as the strips so that the curtains will overtake the vehicle, if it be in motion, or advance over the vehicle surface ahead of the curtain support if the latter be in motion, whereby the lower tips of the curtain strips will also work on the rear vertical surfaces of the vehicle and provide flicking and improved scrubbing action on them as well as the side windows and the sides of vehicles above their widest point.

Still another object is to provide a curtain structure wherein the curtains are oscillated longitudinally of the vehicle and where the length of the strips is graduated such that the tips of the shorter curtain strips flick at and clean the upper portions of flat vertical surfaces of vehicles such as vans or station wagons as well as the horizontal surfaces thereof and the longer strips work on the lower portions of such surfaces and to also provide curtain structures of this character where the length of the strips are graduated in both directions from an intermediate point of the curtain structure longitudinally of the vehicle so that a similar effect may be obtained on both the fronts and rears of such vehicles.

Still another object is to provide a scrubbing apparatus of the character of the preceding objects wherein the curtain strips are afforded a substantial vertical as well as horizontal movement to improve scrubbing.

A specific object is to provide a friction scrubbing apparatus having a pair of sections of curtain-like scrubbing elements disposed from a support in side by side relationship across a veehicle path which sections are each composed of a plurality of curtains and which sections are each reciprocated by a parallelogram lever arrangement through cranks and connecting rods and in a manner that the crank actuating the parallelgram levers of one section is about 90° to 180° out of phase with that actuating the parallelgram levers of the other of said pair of sections.

A further specific object is to provide a friction scrubbing apparatus of the character of the foregoing objects including means for flooding the curtains with detergent and water to help loosen dirt and grime.

A still further object is to provide a friction scrubbing apparatus that may be part of a unit of known automatic car wash equipment wherein the vehicles to be washed are moved under and past the scrubbing apparatus by a conventional roller conveyor system or otherwise or where the scrubbing apparatus of the invention is reciprocated over and past a stationary vehicle as in known coin wash installations.

The above and other objects, features and advantages attending the present invention will be understood from a consideration of the description of a preferred embodiment of the invention following the accompanying drawing:

DESCRIPTION OF THE DRAWINGS

Wherein

FIG. 5 is an electrical control diagram for controlling the motor for driving the scrubbing apparatus of the invention and the water-detergent valve all tied in with the conveyor start so as to interlock them to effect motor and water stop and start with the conveyor;

FIG. 6 is a schematic view showing one manner of employing more than two scrubbing elements; the arrows therein indicating the phase relationships of the units in one possible arrangement to obtain a substantial balance of impact forces;

FIGS. 7 and 8 are fragmentary views of a modified form of operating structure for oscillating the scrubbing members or sections of the invention to obtain greater vertical movement of the curtain strips.

Referring now to the drawings wherein like numerals indicate like elements, FIGS. 1 to 5 illustrate a preferred form of the oscillatory scrubbing members or sections of the invention arranged in a stationary support or arch and adapted to automatically scrub a vehicle as the latter is advanced therethrough by conventional roller or other conveyor mechanism not shown, well known in the art. It will be understood however that the apparatus of the invention may if desired be carried by a movable frame support adapted to be moved back and forth over the vehicle to be cleaned.

In FIGS. 1 to 5, the scrubbing apparatus is designated generally by the reference numeral 10. It includes a stationary frame designated generally by the reference numeral 12. In the illustrated form the frame 12 includes opposite pairs of vertically disposed spread apart legs 14 and 16 respectively and a horizontally disposed bridge portion generally referred to by the numeral 18 spanning the opposite pairs of legs. The legs 14, 16 and bridge 18 define an opening or archway 20. A vehicle 22 is adapted to pass through such opening in the direction of the arrow B.

Figure 1:
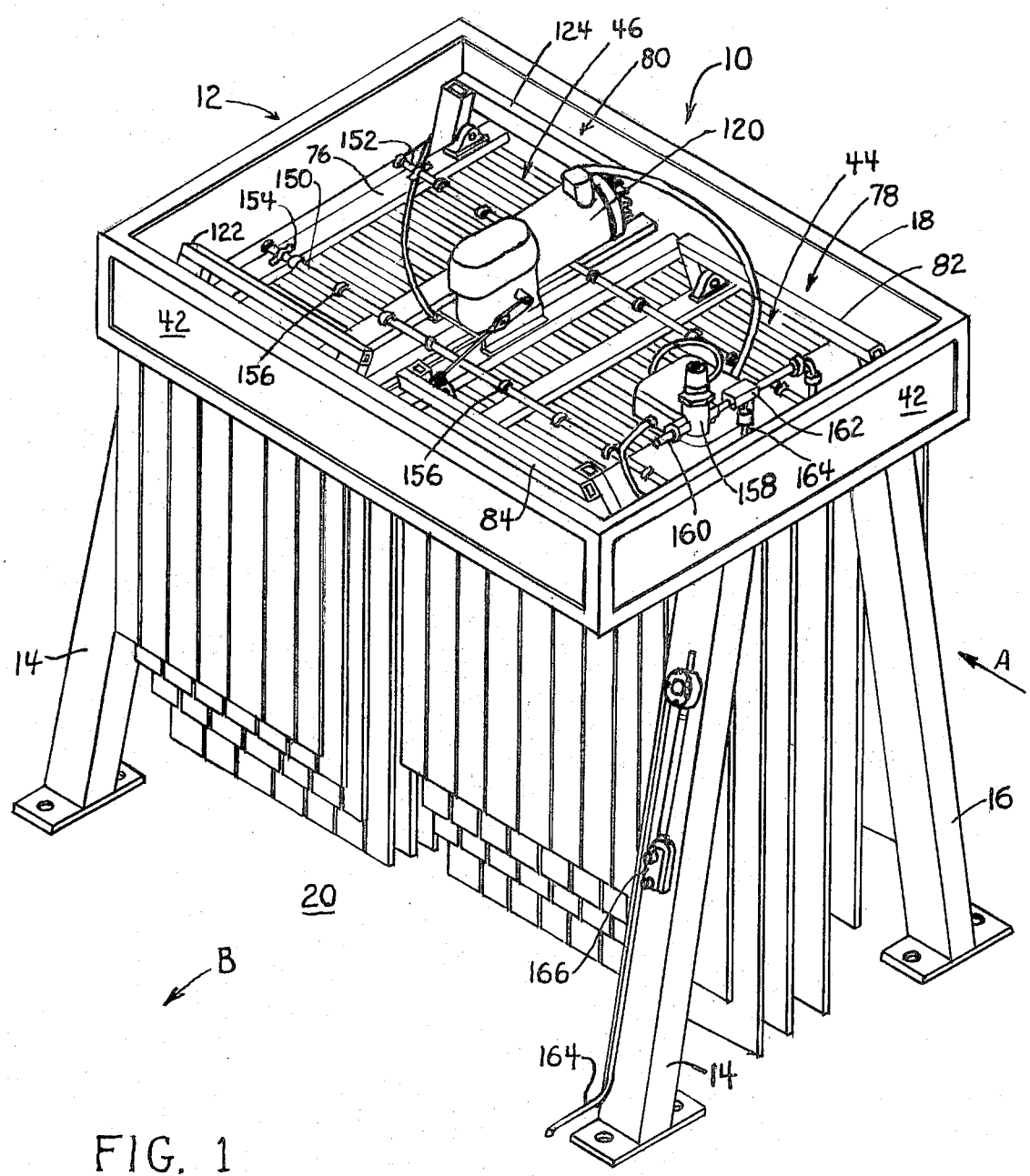
FIG. 1 is an elevational view in perspective showing a scrubbing apparatus in accordance with the present invention.

The bridge 18 is of an open box-like metal construction comprising vertical tubular posts 24 to which are connected, as by welding, upper and lower tubular side members 26, 28 and 30, 32 respectively and upper and lower tubular transverse members 34, 36, and 38, 40 respectively. The side and transverse openings formed by the various members may be closed by panels such as the panels 42 seen in FIG. 1 suitably secured to the upper and lower tubular members described above.

Figure 2:
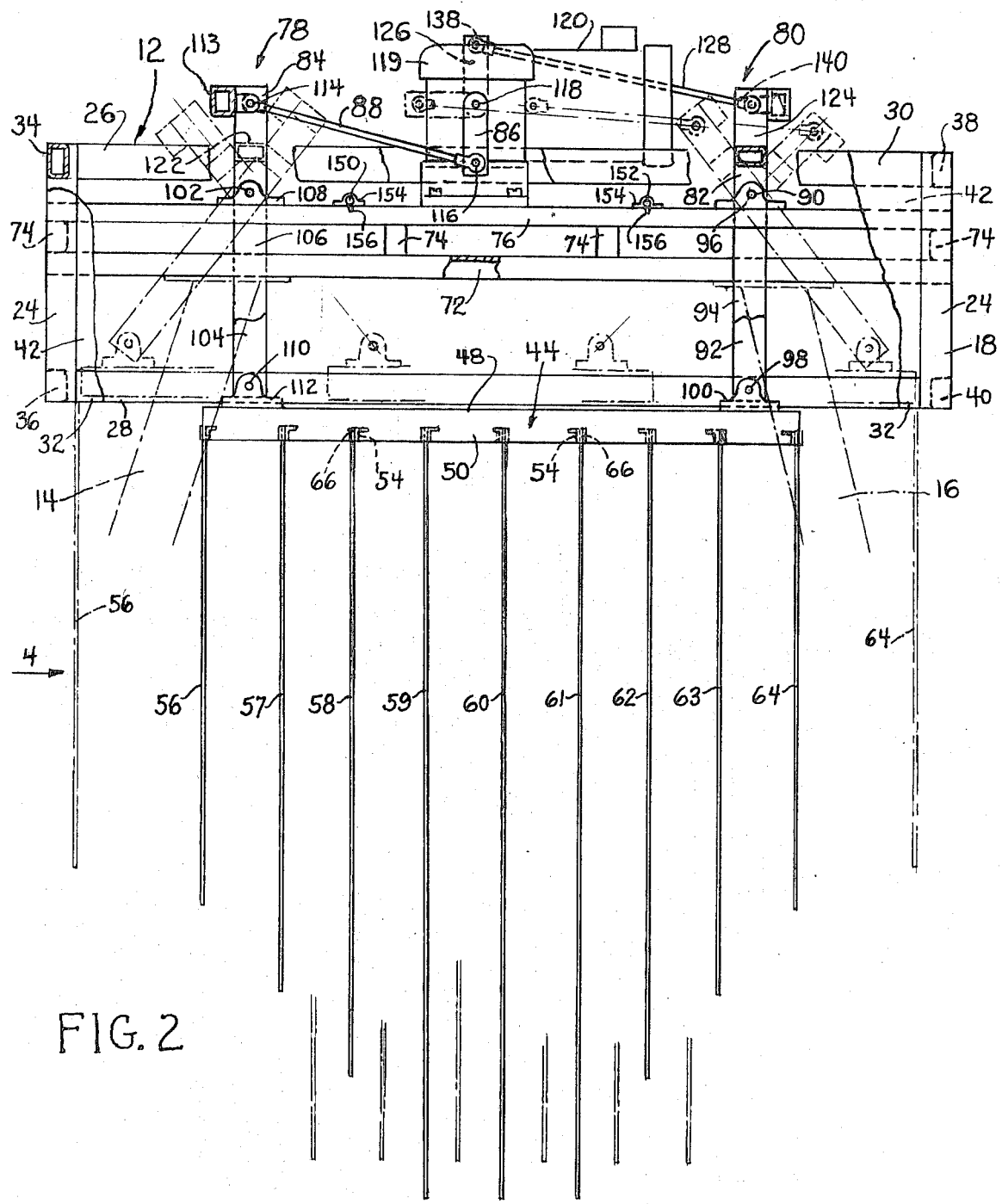
FIG. 2 is a side elevation view of the apparatus of FIG. 1, looking in the direction of the arrow A in FIG. 1, parts being broken away.
Figure 3:
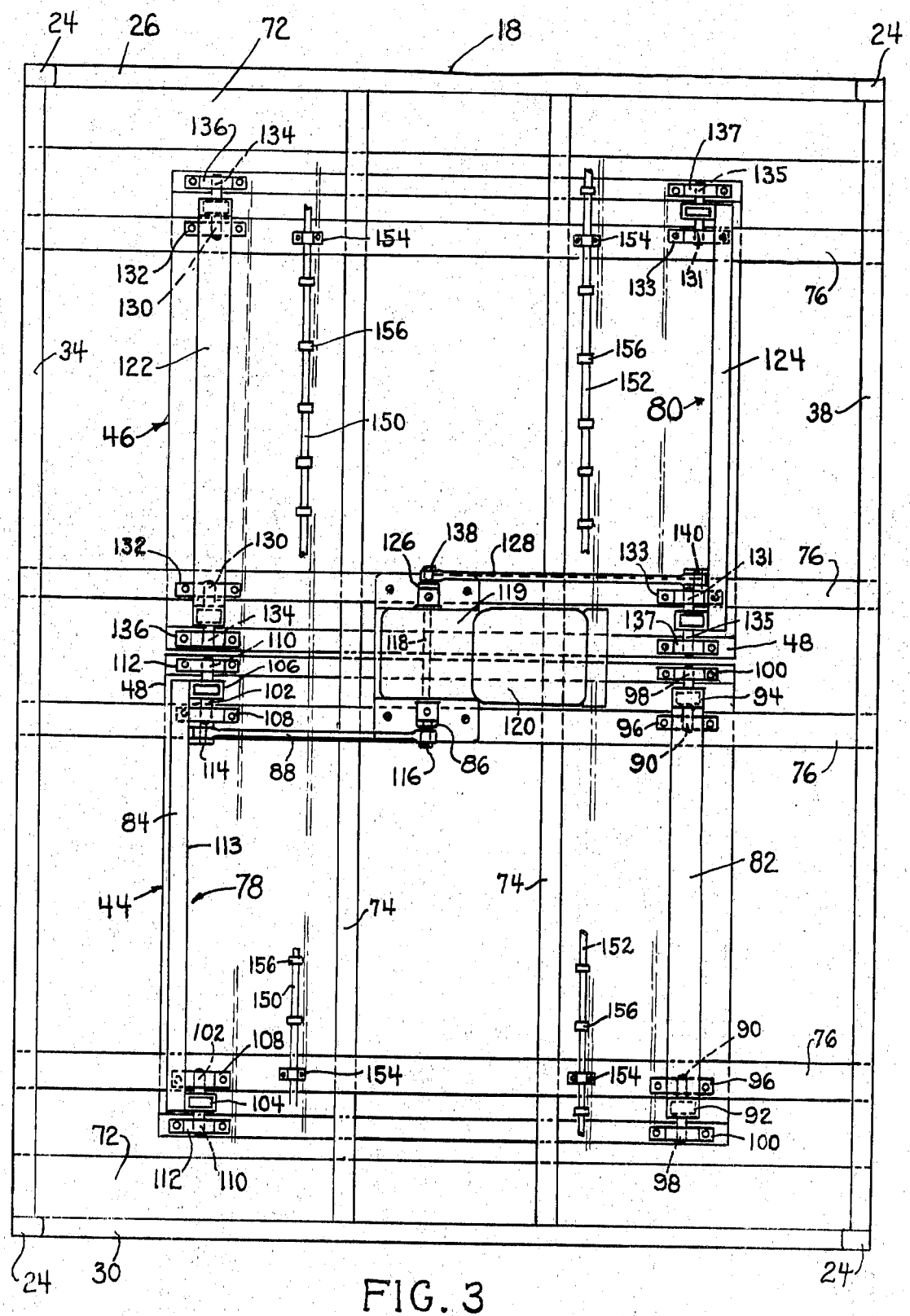
FIG. 3 is a top plan view of the scrubbing apparatus of the invention looking down on FIG. 2.
Figure 4:
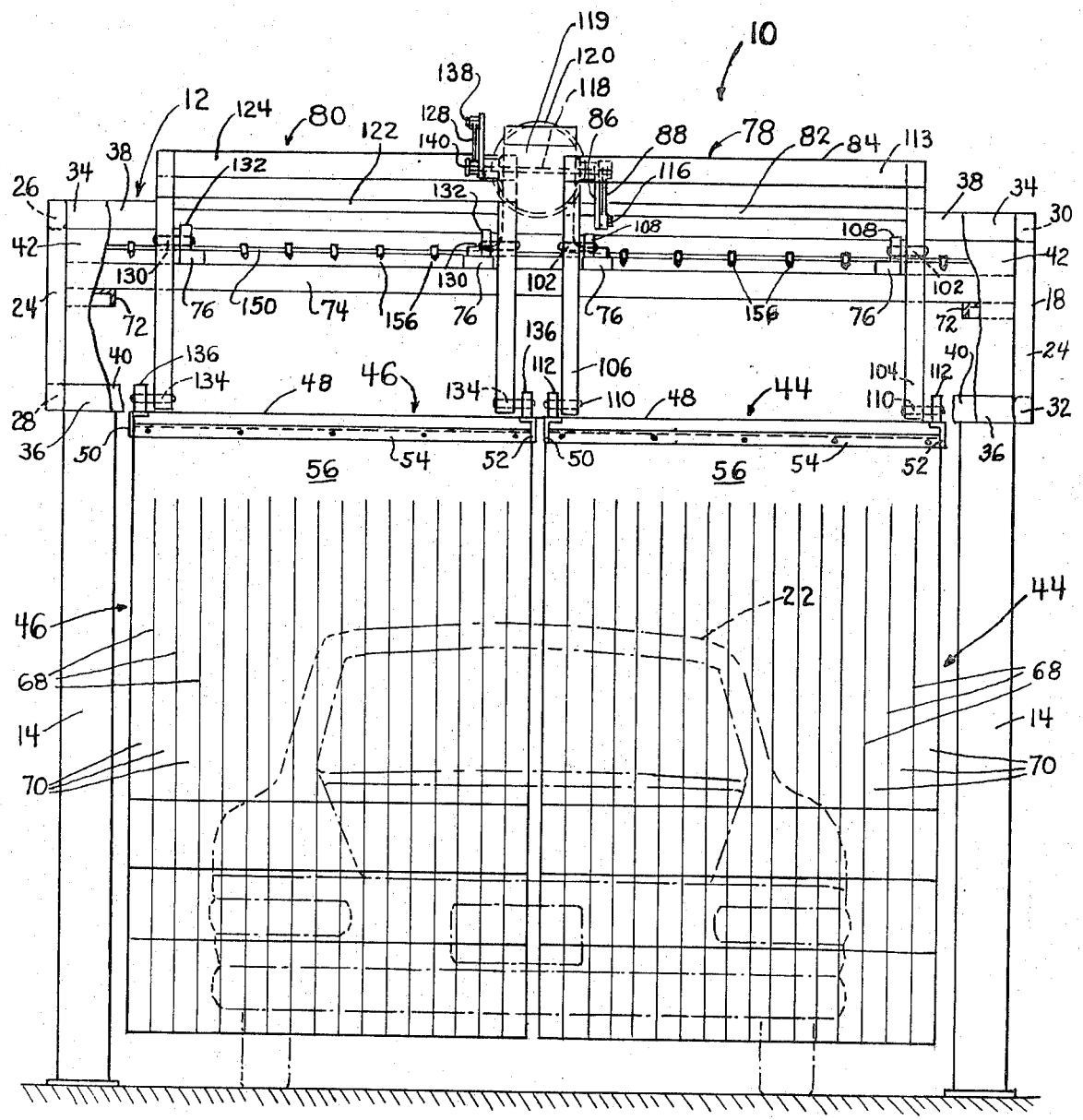
FIG. 4 is a front elevational view of the scrubbing apparatus of the invention looking in the direction of the arrow 4 in FIG. 2, parts being broken away, and showing in phantom a vehicle about to be serviced.

Pivotally suspended from the frame 12 through its bridging portion 18 as seen especially in FIGS. 2 to 4 so as to be operably coupled to the frame 12 are a plurality of scrubbing members or sections, two being shown, designated generally by the numerals 44 and 46, which preferably extend in side by side relationship across the vehicle path so as to provide in effect a continuous scrubbing structure that will project over and beyond the sides of the widest vehicle to be cleaned.

The scrubbing members 44, 46 each comprises in the illustrated embodiment a rectangular curtain or rug support weldment 48 composed as seen in FIGS. 2 and 4 of elongated side angle pieces 50, 52 connected by a plurality of spaced cross angle pieces 54, nine being shown, each supporting a sheet-like element or rug such as the individual curtain elements 56, 57, 58, 59, 60, 61, 62, 63, and 64 held thereto by a screw mounted clamp strip 66 which facilitates easy replacement of a worn curtain. By preference the transverse width of the members 44, 46 will be substantially the same to substantially equalize the impact effect on the vehicle. The curtain-like elements may take the form of carpeting or similar heavy rough textured material preferably of synthetic dirt-repelling fibres. Slits 68 extending upwardly from the bottom edges of the curtain elements in effect divide such curtains into a series of closely spaced normally vertically disposed strips or strands 70. Narrow strip curtains are preferred since they allow easy passage for aerials, mirrors, and ornaments. Although the individual curtains may be of the same vertical length it is preferred that they be graduated in length proceeding from each side of the center curtain 60. Such an arrangement not only enables friction scrubbing of all areas of the vertical surface portions of a vehicle but will, as hereinafter described, provide strips to flick at all areas and do an equally efficient job of cleaning on both the front and rear vertical surfaces of vehicles such as vans and station wagons.

Referring now again to FIGS. 2 to 4, the manner in which the scrubbing members 44 and 46 are operably coupled to and supported from the frame 12 through its bridge portion 18 is apparent. Thus welded to the corner posts 24 and extending longitudinally of the vehicle path at each side of bridge 18 are channels 72 which carry spaced apart transverse rectangular runners 74 that in turn support longitudinally extending bearing support bars 76 which carry dual but similar lever and linkage operating systems designated by the numerals 78, 80 which provide lever means for coupling the scrubbing members 44 and 46 respectively to the frame 12 and supporting the same and means including a source of power and linkage for operating the coupling means.

Thus the lever and linkage operating system 78 comprises a support arm 82, a drive arm 84, a crank arm 86, and a connecting drive rod 88. The support arm 82 which is of U-shape is pivotally supported adjacent its upper end on the spaced bars 76 of the frame 12 by axially aligned stub shafts 90 carried by the parallel leg portions 92, 94 of the arm, which shafts as seen in FIG. 3 project inwardly of the leg portions and are received in ball bearing blocks 96 carried by the bars 76. The lower ends of the legs of the arm 82 are pivotally connected to one end of the curtain support weldment 48 through similar axially aligned stub shafts 98 which project outwardly to engage in ball bearing mounts 100 carried by the weldment 48, The drive arm 84 is also of generally U-shape and pivotally supported by axially aligned stub shafts 102 carried by leg portions 104, 106 of this arm 84. These shafts parallel the shafts 90 and project inwardly of the leg portions toward each other and are received in ball bearing blocks 108 carried by the bars 76. As in the case of arm 82 the lower ends of the legs 104, 106 of arm 84 are pivotally connected to the curtain support weldment 48 at the opposite end from the arm 82 through axially aligned stub shafts 110 which parallel the shafts 98 and which project outwardly to engage in ball bearing mounts 112 carried by the weldment 48. The drive arm 84 includes an upper cross bar 113 paralleling the pivot shafts 102 to which one end of the connecting rod 88 is pivotally secured through a pivotal pin connection 114. The other end is pivotally connected to the outer end of crank arm 86 by a stud connection 116. The crank arm 86 is fixed to one end of a through output shaft 118 of a built-in speed reducer or gear box 119 of a drive motor 120. The arm 86 is rotatable through a full 360° of arc. The motor 120 is suitably supported and fastened to two central bars 76 of frame 12 generally midway longitudinally of the frame 12. In its rotation the crank 86 will actuate the rod 88 effecting a parallelogram operation of the drive arm 84 and support arm 82 causing the scrubbing member 44 to oscillate from the midposition seen in FIG. 2, to the opposite extremes indicated by the dot and dash phantom showings in this figure. It will be evident that in this operation the individual curtain strips 70 will obtain a substantial amount of vertical as well as horizontal movement and as a result of the rapid oscillatory movement receive an additional horizontal movement through swing out or inertia.

The lever and linkage operating system 80 which carries and operably couples the other scrubbing member 46 to the frame 12 and operates the same from a power source comprises as in the case of the corresponding system 78, a support arm 122 of U-shape, a drive arm 124 of U-shape, a crank arm 126, and a connecting drive rod 128 all corresponding in general character to those of the system 78. The arms 122 and 124 are pivotally supported through stub shafts 130, 131 respectively by ball bearing blocks 132, 133 respectively carried by the frame bars 76 and pivotally connect with the curtain support weldment 48 of the scrubbing member 46 through stub shafts 134, 135 respectively carried by ball bearing mounts 136, 137 respectively, secured to the weldment 48. Moreover, the connecting rod 128 is pivotally connected by pivotal connections 138, 140 respectively to the crank 126 and drive arm 124. The arms 122, 124 of system 80 are arranged in reverse relationship to that of the arms 82, 84 of the system 78. The crank arm 126 is connected to the opposite end of the drive motor shaft 118 and in 180° opposite relationship to the crank arm 86 as the crank 86 rotates through 360° of arc. With the arrangement shown the dual linkage systems are 180 degrees out of phase so that the scrubbing member 44 moves in one direction while the scrubbing member 46 moves in the other direction.

In the above, the bearing blocks 100, 112, 136, and 137 may be secured to the under side of the angle members 50, 52 of the weldments 48 in such a way that the weldments cannot fall should the bearing block fasteners become disengaged. Moreover, separate coordinated motor drive assemblies 120 may be employed for each of the operating systems 78, 80 or separate gear boxes 119 from a common drive motor 120 to reduce inertia loading.

It will also be understood that although only two scrubbing members 44 and 46 with their respective lever and linkage operating systems 78 and 80 are shown in the drawings, more than two scrubbing members may be employed for example as schematically illustrated in FIG. 6 which shows four such members. In that event the motor drive shaft 118 will be extended to actuate duplicates of the lever and linkage systems and the crank arms 86 and 126 will be positioned so that one half of the scrubbing members will be out of phase with the others and each preferably out of phase with its adjacent scrubbing member as indicated for example by the arrows in FIG. 6.

Means are provided for flooding the curtains and vehicle with an aqueous detergent and/or water. To this end as best seen in FIGS. 1 to 4 there is provided a pair of spaced spray headers 150, 152 extending across the scrubbing members 44 and 46 and secured to the bridge bars 76 by the clamps 154. Each header is provided with a plurality of spaced jet spray heads 156 to provide water and detergent to the scrubbing members and vehicle below. Feed is controlled by a solenoid valve 158, (See FIG. 1) located behind a water inlet 160 which is connected to a source of water not shown. When the valve is open water under pressure flows to a proportioning valve 162 to which detergent is also fed by the tube 164 from a source thereof. The mixture is then directed to the headers and spray jets.

Control of the scrubber member drive motor 120 and water solenoid valve 158 is schematically shown in FIG. 5. As there shown the motor 120 energization is controlled by a switch 166 which along with the switch 168 controlling the water solenoid valve 158 is interlocked with the conveyor system so that neither functions when the conveyor is not operable. The same circuit controls current flow to the primary coil 170 of a transformer 172, the secondary 174 of which provides current to energize the solenoid of valve 158 to open this valve. The latter is also under control of an entrance actuator switch 176 of conventional form located adjacent the entrance of the scrubber unit so that fluid is not directed to the scrubbers until the vehicle enters the opening 20 of the scrubbing unit.

In operation of the apparatus with the switches 166, 168 closed and the conveyor actuated to move a vehicle to be cleaned into the opening 20 of the frame 14, the motor 120 will have been started to rapidly oscillate the scrubber members 44, 46 back and forth as described above and in 180° out of phase relationship. The water solenoid valve 158 will open when the vehicle has closed the entrance actuator switch 176 and a shower of water and detergent will be jet sprayed over the entire scrubber units 44, 46. When in contact with the vehicle surfaces the individual strips 70 of the curtains 56–64 will by impact and scrubbing action afforded by the positive vertical movement given the strips and relative horizontal movement between them and the vehicle clean the vehicle surfaces. Moreover the rate of oscillation of the scrubbing units is sufficient to cause the strips by reason of their mass and flexibility to swing out beyond the curtain supports 48 when not in contact with a vehicle surface such that when contact is achieved the strips will impact with the vehicle and flick at and additionally clean the surfaces. This is especially significant in cleaning the lower portions of bumpers and grilles and of vertical surfaces of vans and station wagons. Moreover the rate of oscillation of the scrubbing members for example 30 cycles per minute, is selected to give sufficient speed to the curtains whereby they will swing out beyond the support so that the lower tips of the strips 70 can work on front vertical surfaces of a vehicle and low surfaces and such that their linear speed on the return stroke in the direction of the vehicle travel will be greater than the linear speed of the vehicle so that the curtain strips 70 will overtake the vehicle and their lower tips will work on the rear vertical surfaces of the vehicle. This action also facilitates extra cleaning of the sides and windows of vehicles and the recessed wiper wells.

When the strips 70 are graduated in length the short strips not only help to clean the vertical surfaces of a vehicle but the horizontal surfaces as well. Although most flicking action takes place at the ends of the free swinging strips it has been observed that as the horizontal car surfaces come under the curtains, the longer strips lay on the car in such a way that they just flop over leisurely, end for end, producing a gentle wiping action. At the same time, the ends of the shorter strips that are just long enough to reach the horizontal surface, flick more violently, producing a scrubbing action.

It is also to be noted that with the curtains of the two scrubbing members 44, 46 oscillating out of phase, specifically 180° out of phase, one member moves in the direction of travel of the vehicle and the other moves in the opposite direction. There results from this action a balance of inertia and friction rubbing forces that materially reduces the total impact forces tending to push light weight and other vehicles ahead of the conveyor system.

FIGS. 7 and 8 illustrate a modification of the invention whereby greater vertical movement of the scrubbing member curtains and improved cleaning of the vertical front and rear surfaces of vehicles such as vans and station wagons is believed possible. Here the weldments 180 supporting the curtains 182 of the scrubbing members or sections 44A and 46A are in the form of segments of a cylinder coupled to the frame 12 by end support arms 184, 186 of generally Y shape having inwardly projecting stub shafts 188 pivotally mounting in bearings 190 secured to the frame 12. The shafts 188 are located on the centers of the segments 180 such that the members 44A and 46A and the curtains 180 oscillate about these centers. The members 44A and 46A are driven through the coupling arms 184, 186 by dual operating linkage systems 192, 194 arranged to cause the members 44A and 46A to oscillate 180 degrees out of phase. Thus each arm 186 has an upper extension 196 the outer end of which is pivotally connected as at 198 with one end of a connecting rod 200 the opposite end of the rod pivotally connecting as at 202 with a crank 204 carried by the output shaft 118 of the motor 120. As shown the cranks 204 for the systems 192, 194 are located on opposite sides of the motor 120 but are positioned in opposite angular relationships to provide the 180° out of phase oscillations by members 44A and 46A. The cranks 204 have 360° of rotation.

It will be noted that the stepped relationship between adjacent curtains described above with respect to the curtains of FIG. 2 is here optainable with curtains of equal length because of the arcuate shape of the weldment 180. Since the weldments 180 swing about a fixed single axis as distinguished from the parallelogram action of the structure in FIG. 2, the weldment 180 carries the curtains through a greater vertical distance for the same crank throw. The operation of the scrubbing members 44A and 46A are otherwise substantially the same as described with respect to the members 44 and 46.

Figure 9:
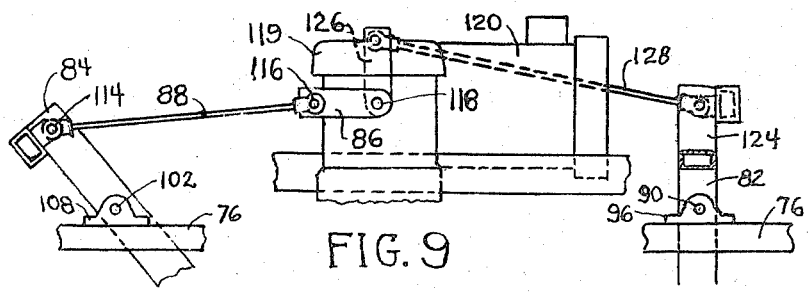
FIG. 9 is a fragmentary view of the apparatus of FIG. 2 but shows the operating systems 90° out of phase.

Experience has indicated that in certain constructions the life of the speed reducer 119 and motor 120 may be extended by operating the scrubbing members 44, 46 systems 78, 80 with an out of phase relationship of less than 180°. Such reduces the torsional inertia loads transmitted to the frame and the wear on the bearings while retaining the many advantageous feaatures of scrubbing described above and a balance of opposing pushing forces during a portion of the operating cycle. FIG. 9 illustrates the FIG. 2 construction to provide such an arrangement. Here the scrubbing members 44, 46 are operated by systems 78, 80 which are substantially 90 degrees out of phase. This arrangement provides maximum load balance on the gear box and motor assembly and an action where one scrubbing member is following its upward vertical component while the other follows its downward component and the inertia forces of one assist the other in overcoming its reversing inertial loads. This feature may also be applied to the modification of FIGS. 7 and 8.

From the foregoing description of the invention it will be evident that a novel friction scrubbing apparatus for vehicles has been provided that achieves improved cleaning of front and rear surfaces of vehicles; that provides a split curtain member arrangements wherein one curtain section oscillates out of phase with the other through a dual linkage operating system capable of producing balanced inertial and/or friction scrubbing forces facilitating a smooth running apparatus subject to minimum maintenance; that achieves improved cleaning of the upper sides and side windows of the vehicle, front and rear bumpers and that produces improved cleaning of recessed window wiper wells. It will be understood that various changes and modifications of the structures shown and described will occur to those skilled in the art without departing from the spirit and intent of the invention and all such changes, modifications and equivalent applications and structures are contemplated as come within the purview of the following claims.

What is claimed is:

1. Scrubbing apparatus for vehicles comprising a frame having an opening therein adapted to receive a vehicle for passage therethrough by relative movement between said frame and vehicle along a path lengthwise of the vehicle, at least two scrubbing members carried by said frame and disposed in said opening side by side transversely of said lengthwise path, each scrubbing member comprising a rigid oscillatory support element carried by said frame, a plurality of scrubbing curtains suspended from said support element and a plurality of substantially rigid mounting pieces, at least one for each said curtain fixedly mounting said curtains to said support element, said curtains being arranged on said support element in spaced generally parallel relationship with each curtain extending transversely of said lengthwise path and having an end portion that will extend beyond a side of the vehicle, and each curtain presenting a row of closely related elongated flexible scrubbing strips normally freely hanging when the scrubbing members are beyond the ends of the vehicle and substantially in continuous contact with the vehicle during oscillations of the support element when said members are over the vehicle, and there being means for oscillating said scrubbing curtains of said scrubbing members through said support elements in said lengthwise path whereby the scrubbing strips thereof may act on the top, side, front and rear surfaces of a vehicle and the lower portions of bumpers and recessed window wells of a vehicle with a scrubbing and flicking action to clean the same, and relatively positionable means for controlling the oscillations of said support elements and scrubbing curtains in a manner that the oscillations of the support elements and scrubbing curtains of one half the number of said scrubbing members are out of phase with those of the other half of said number of said scrubbing members.

2. Scrubbing apparatus in accordance with claim 1 wherein said halves of said number of scrubbing members substantially always move in opposite directions.

3. Scrubbing apparatus in accordance with claim 2 wherein the effective total width of the scrubbing members moving in one direction is substantially the same as the total width of the scrubbing members moving in the opposite direction.

4. Scrubbing apparatus in accordance with claim 1 wherein one half the number of said scrubbing members have their oscillations substantially 90° to 180° out of phase with those of the other one half of said scrubbing members.

5. Scrubbing apparatus in accordance with claim 4 wherein said out of phase relationship is substantially 90°.

6. Scrubbing apparatus in accordance with claim 4 wherein said out of phase relationship is substantially 180°.

7. Scrubbing apparatus in accordance with claim 1 wherein the linear speed of the members in one direction of their oscillations exceeds the linear speed of the frame and vehicle whereby to overtake them.

8. Scrubbing apparatus in accordance with claim 1 wherein the means for oscillating the curtains and support elements of said scrubbing members comprises means pivotally coupling said support elements to said frame and means for operating said coupling means.

9. Scrubbing apparatus in accordance with claim 8 wherein said coupling means comprises lever means pivotally interconnecting each support element to the frame for swinging movement relative to the frame and wherein said operating and control means comprises motor means, rotatable crank means operable by said motor means, said crank means being relatively positionable for controlling the phase relationship of the oscillations of the scrubbing members, and connecting rod means pivotally interconnecting said lever means and crank means.

10. Scrubbing apparatus in accordance with claim 8 wherein said coupling means is rigidly connected to the support element and swingable about a single axis associated with said frame.

11. Scrubbing apparatus in accordance with claim 10 wherein the support element is in shape substantially a segment of a cylinder.

12. Scrubbing apparatus in accordance with claim 1 wherein the means for oscillating the curtains and support elements of said scrubbing members comprises motor means and dual operating systems of levers and links one system for each scrubbing member operably interconnecting the support elements and motor means and the support elements and frame.

13. Scrubbing apparatus in accordance with claim 1, wherein the means for oscillating the curtains and support elements of said scrubbing members comprises a plurality of pairs of oscillating levers, each pair coupling a different support element to the frame for oscillating movement relative thereto, a plurality of rotatable cranks, motor means for rotating said cranks and a plurality of links, each link coupling one of said cranks with one of the levers of a different pair thereof, and no link coupling with the same crank and wherein the means for controlling said out of phase oscillations of said scrubbing curtains comprises relatively positionable cranks whereby the cranks related to said side by side scrubbing members are in such a phase relationship to each other that during a substantial portion of the operation of said scrubbing members the scrubbing curtains of one of said side by side scrubbing members moves in one direction while those of the other move in the opposite direction.

14. Scrubbing apparatus in accordance with claim 1, wherein the freely hanging elongated flexible scrubbing strips of said scrubbing curtains of a scrubbing member are narrow strips extending downwardly from its support element to below the bumpers of the vehicle to pass through said frame.

15. Scrubbing apparatus in accordance with claim 14 wherein the curtains of each scrubbing member are graduated in length, decreasing in length from a curtain intermediate the end curtains of a scrubbing member outwardly in both directions to the outermost curtains.

16. Scrubbing apparatus in accordance with claim 14 including a plurality of jet sprays arranged above and within the plurality of curtains of a scrubbing member and over the width of such curtains, operable for flooding the curtains and vehicle with dirt loosening liquid.

* * * * *